United States Patent
Mareau et al.

(10) Patent No.: US 11,035,261 B2
(45) Date of Patent: Jun. 15, 2021

(54) INSIDE-COOLED DISC VALVE AND A SEMI-FINISHED PRODUCT AND METHOD FOR ITS PRODUCTION

(71) Applicant: FEDERAL-MOGUL VALVETRAIN GMBH, Barsinghausen (DE)

(72) Inventors: Andre Mareau, Strasbourg (FR); Stefan Kellermann, Barsinghausen (DE); Antonius Wolking, Barsinghausen (DE); Oliver Schulze, Donaueschingen (DE); Andreas Heinek, Bannewitz (DE); Guido Bayard, Dortmund (DE); Daniel Eisenring, Blumberg (DE)

(73) Assignee: Federal-Mogul Valvetrain GmbH, Barsinghausen (DE)

(*) Notice: Subject to any disclaimer, the term of this patent is extended or adjusted under 35 U.S.C. 154(b) by 0 days.

(21) Appl. No.: 16/480,538

(22) PCT Filed: Jan. 25, 2017

(86) PCT No.: PCT/EP2017/051516
§ 371 (c)(1),
(2) Date: Jul. 24, 2019

(87) PCT Pub. No.: WO2018/137762
PCT Pub. Date: Aug. 2, 2018

(65) Prior Publication Data
US 2019/0338682 A1    Nov. 7, 2019

(51) Int. Cl.
*F01L 3/14*    (2006.01)
*F01L 3/06*    (2006.01)
(Continued)

(52) U.S. Cl.
CPC .............. *F01L 3/14* (2013.01); *F01L 3/06* (2013.01); *F01L 3/20* (2013.01); *F16K 1/32* (2013.01);
(Continued)

(58) Field of Classification Search
CPC ....... F01L 3/14; F01L 3/06; F01L 3/20; F16K 1/32
See application file for complete search history.

(56) References Cited

U.S. PATENT DOCUMENTS

| | | | |
|---|---|---|---|
| 1,109,628 A | 9/1914 | Hallett | |
| 2,029,507 A * | 2/1936 | Scrimgeour | B21K 1/22 29/888.451 |

(Continued)

FOREIGN PATENT DOCUMENTS

| | | |
|---|---|---|
| EP | 0535888 A1 | 4/1993 |
| EP | 2540414 A1 | 1/2013 |
| WO | WO 2011/027063 A1 | 3/2011 |

*Primary Examiner* — Kevin A Lathers
(74) *Attorney, Agent, or Firm* — Robert L. Stearns; Dickinson Wright, PLLC

(57) ABSTRACT

A method for the production for a semi-finished valve product (4), includes casting, forging, deep-drawing, pressing and/or drop-welding of one or several metal material into a semi-finished valve product (4) that corresponds to a circle segment of a valve cut open in the axial direction. A valve is produced by welding together at least two semi-finished valve products (4) into an internally cooled valve, with the weld running in the axial direction of the valve.

9 Claims, 2 Drawing Sheets

(51) Int. Cl.
*F01L 3/20* (2006.01)
*F16K 1/32* (2006.01)
*F16K 49/00* (2006.01)

(52) U.S. Cl.
CPC ......... *F16K 49/007* (2013.01); *F01L 2303/00* (2020.05)

(56) References Cited

U.S. PATENT DOCUMENTS

| | | | | |
|---|---|---|---|---|
| 2,119,042 A | * | 5/1938 | Charlton | F01L 3/14 |
| | | | | 123/188.3 |
| 2,471,936 A | * | 5/1949 | Colwell | B23K 5/006 |
| | | | | 29/888.451 |
| 2020/0094323 A1 | * | 3/2020 | Mareau | F16K 3/246 |

* cited by examiner

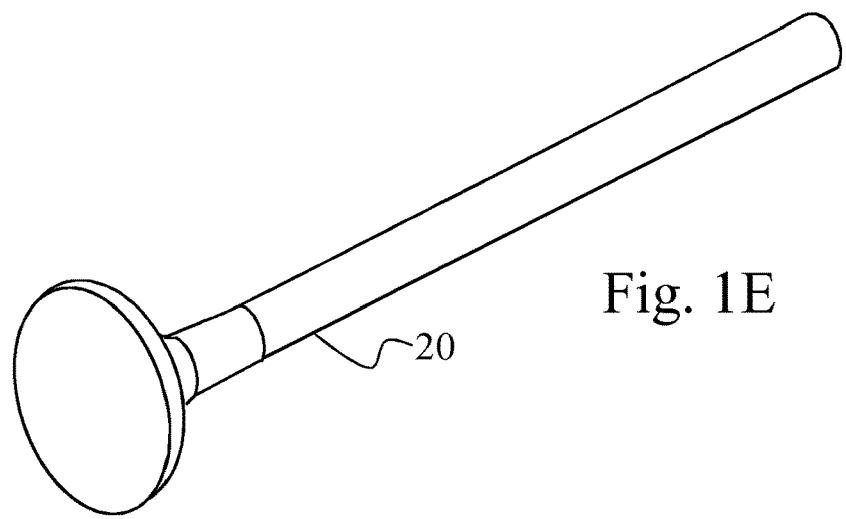
Fig. 1E
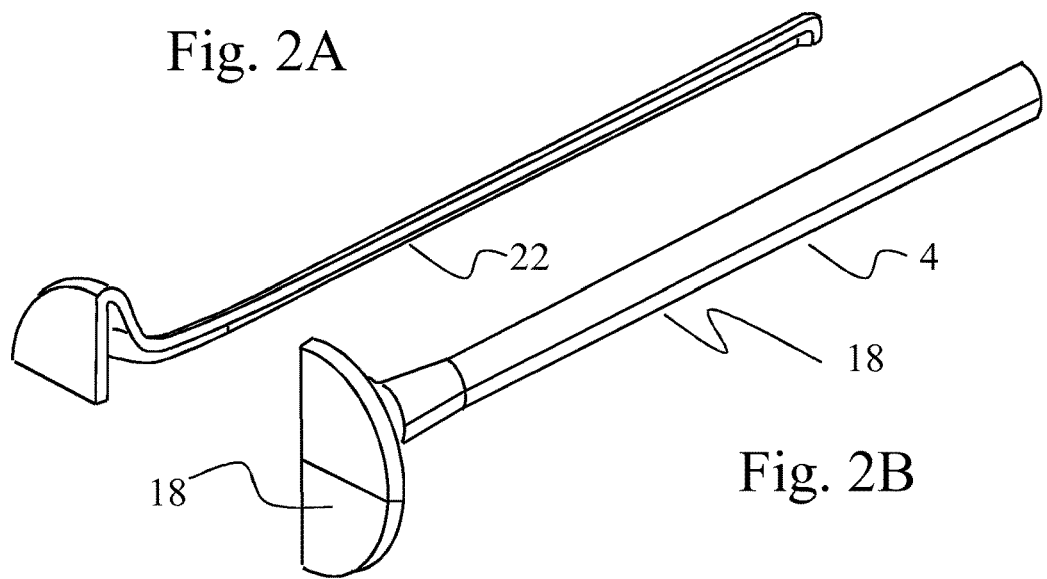
Fig. 2A
Fig. 2B
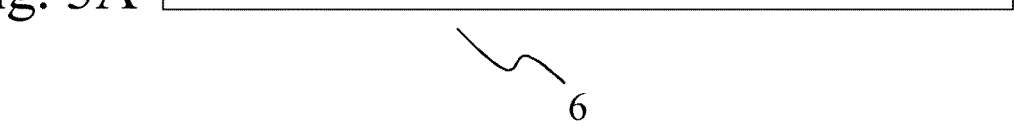
Fig. 3A
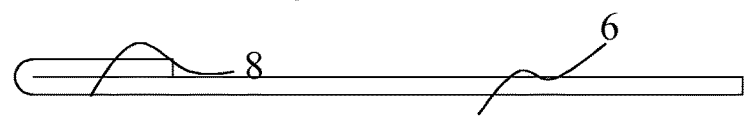
Fig. 3B
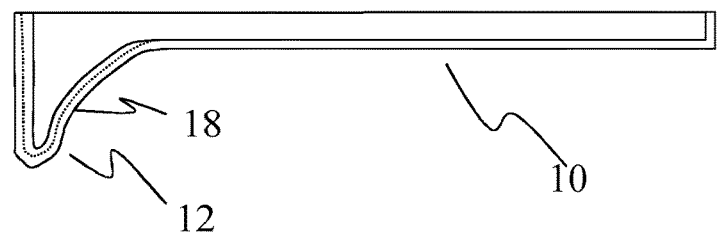
Fig. 3C

INSIDE-COOLED DISC VALVE AND A SEMI-FINISHED PRODUCT AND METHOD FOR ITS PRODUCTION

BACKGROUND

1. Technical Field

This invention refers to an inside-cooled valve for combustion engines in half-shell build. This invention specifically refers to a method with which a half-shell semi-finished product can be used to produce a hollow or inside-cooled valve.

2. Related Art

Internally cooled valves have been known for some time. Several ways of how to produce hollow or internally cooled valves are known already. Usually, the valve stems are drilled out or the valve stem is formed of a raw piece already. The valve stem is then filled with sodium and usually closed via a lid. It is only known so far to join or weld the disc valves together out of different rotation-symmetrical parts.

Simplified production of objects is striven for here as well.

Based on machined rotation-symmetrical initial elements in which two to three parts, such as the valve disc, valve stem, valve bottom and valve end as well as sodium filling are welded together into a stack in sequence, only one option results conventionally for producing different components together, such as producing the valve head and the valve stem together by deep drawing. However, this approach must be considered used to capacity by now.

SUMMARY

This invention provides a method in which a hollow or internally cooled valve is produced of two half-shells, with a later valve symmetry axis being placed in the surface that is defined by the contact surface of the two half-shells.

One basic method is in casting, forging, deep-drawing, pressing or drop forging of one or several metal materials into a semi-finished valve product that corresponds to a circle or rotation body segment of a valve cut open in the axial direction.

Forming of the material may also include the forming of grooves in the area of the valve stem to attach the valve in a cylinder head later with a valve control or taper pieces. Another benefit of such a structure is in the ability of better aligning the semi-finished valve products both on the disc side and the shaft end in order to better design the welding method or permit better alignment of the semi-finished valve products when welding.

In another embodiment of the method, the circle segment is made of a semi-circle or semi-rotation body, so that the semi-finished valve product corresponds to a half shell, or with the circle segment corresponding to at least one third-circle and the semi-finished valve product thus corresponding to at least a third-shell. The valve can thus be put together and welded together out of several parts into a rotation-symmetrical valve body like pieces of a cake. The smaller or narrower the individual pieces or semi-finished valve products are, the less the material will have to be deformed during forming from a sheet, which makes it possible to achieve even wall thickness in a simple manner. The degree of deformation of the individual semi-finished valve products can be reduced this way as well.

The method results in the semi-finished valve product according to the invention, in the form of a circle segment or a rotation body segment of a valve that was cut open in the axial direction. The form of the semi-finished valve product comprises a pipe segment as segment of a valve stem, a valve head segment as segment of a valve head and a valve bottom segment as segment of a valve bottom. Additionally, it may be intended that the semi-finished valve product has an even or equally large wall thickness everywhere or continually. It may also be intended that the semi-finished valve product has an essentially even or same wall thickness everywhere. It is also possible to specify that a valve bottom and/or valve head has a material thickness that is twice or more, especially three times or more as large as a wall thickness of the stem. The dimensions of the wall thickness here refer to the corresponding segments of the parts.

In one version of this invention, the semi-finished valve product forms a semi-circle segment and therefore forms a half shell. In another embodiment, the semi-finished valve product forms a circle segment of at least or at most one third-circle, with the semi-finished valve product corresponding at least or at most to a third-shell. This is to mean that the semi-finished valve product can also form a quarter-circle segment, a fifth-circle segment, a sixth-circle segment or a higher or narrower circle segment.

According to another aspect of this invention, a method is provided for the production of a valve from at least two semi-finished valve products, as described above. The method comprises provision of at least two of the semi-finished valve products described above, attachment of the at least two semi-finished valve products in a valve, with the semi-finished valve products surrounding a cavity, followed by welding together of the arranged at least two semi-finished valve products into a valve.

In another exemplary embodiment of this invention, the method further comprises provision of sodium or a low-melting alloy in the cavity. The sodium or alloy with low melting point serves as a cooling agent in order to receive an internally cooled disc valve that permits a "shaker cooling". Provision is preferably performed before welding together of the semi-finished valve products. However, it is also possible to only introduce the sodium into the valve later through openings that are connected to the cavity, with these openings being closed in a further work step.

Furthermore, this invention provides a valve that is formed of at least two semi-finished valve products that are arranged into a valve and welded together into a valve with a cavity, with the cavity preferably filled with a coolant, preferably sodium.

THE DRAWINGS

Hereinafter, this invention is illustrated based on exemplary embodiments that are presented as schematics in the figures.

FIGS. 1A to 1E represent the production method according to the invention for an internally cooled valve based on individual steps.

FIGS. 2A and 2B show another option of producing an internally cooled valve according to the inventions.

FIGS. 3A to 3C show an option of forging or drawing a semi-finished valve product from one sheet.

DETAILED DESCRIPTION

Figures 1A, 1B, 1C, 1D:
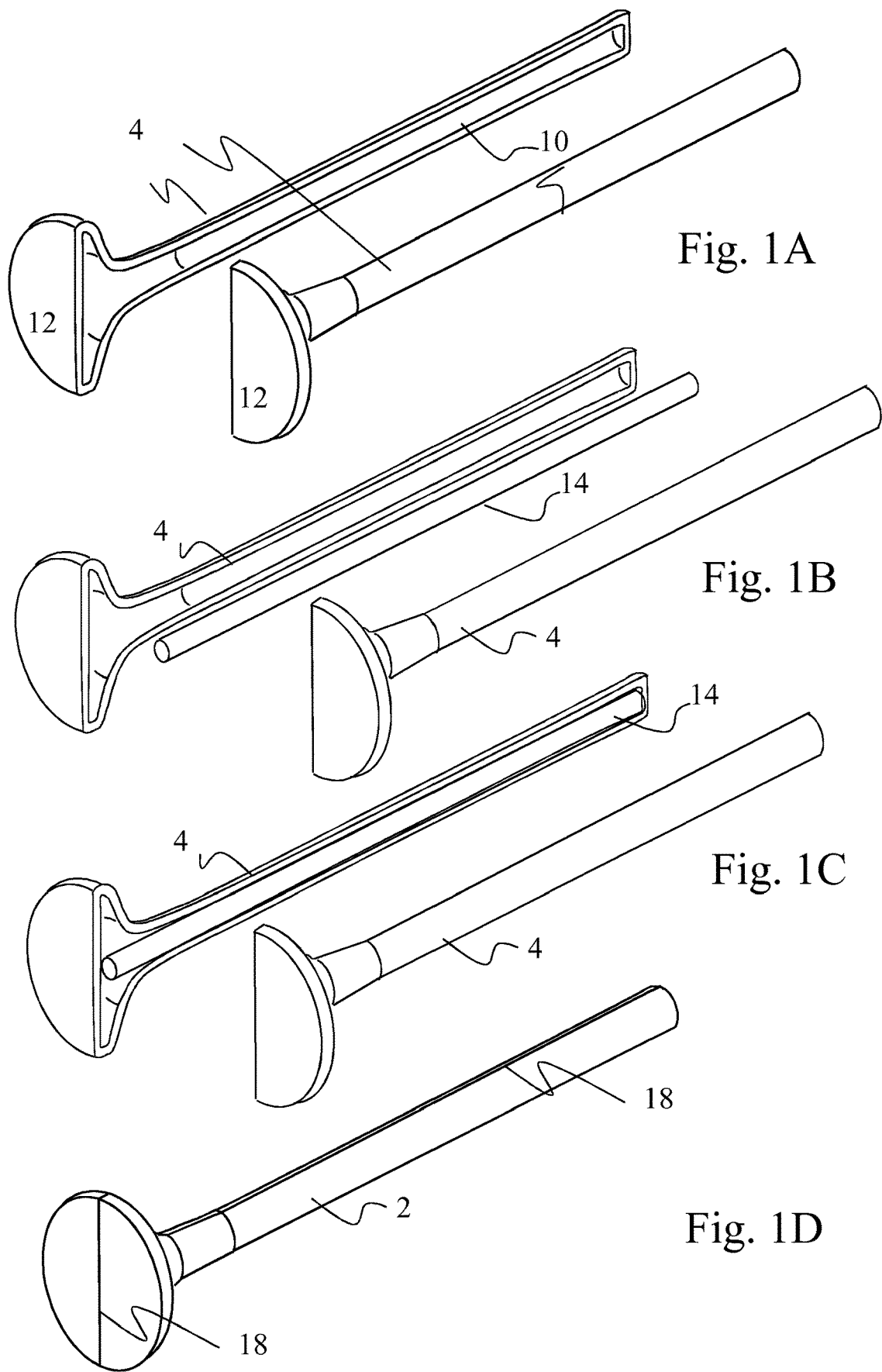

Below, same or similar reference signs are used in the descriptions and the figures to refer to same or similar elements or components.

FIG. 1A shows two semi-finished valve products 4 that are designed as valve half shells here. The valve half shells 4 essentially correspond to an internally cooled valve that has been cut open in the axial direction. The semi-finished valve products 4 comprise a valve stem 10 and a valve head 12. The semi-finished valve products essentially have an even wall thickness. However, it is also possible to use semi-finished valve products with a wall thickness that is larger than the wall thickness of the stem, e.g., in the head area.

In FIG. 1B, a sodium rod 14 is placed between the two semi-finished valve products 4, to serve as coolant. It is also possible to choose a shape for the sodium rod 14 that permits even distance from an inner surface of the respective valve half shells.

In FIG. 1C, the sodium rod 14 is inserted in one of the semi-finished valve products 4.

FIG. 1D shows the joined semi-finished valve products 4 connected with a weld 18. The finished internally cooled valve 2 may be subjected to machining in order to smooth the surface of the weld 18 in the longitudinal direction.

FIG. 1E can be considered a complete internally cooled valve 2 in which the longitudinal weld 18 from FIG. 1D has been levelled by final processing. The illustrated internally cooled valve has additionally been applied with a surface coating, so that the longitudinal weld is no longer visible in the coated valve 20.

FIG. 2A shows a semi-finished valve product 24 in the form of a quarter circle segment of a valve. Such a semi-finished valve product 24 can be produced with much less forming, which causes much lower tension in the semi-finished valve product 24. It is also imaginable to produce semi-finished valve products in the form of a third-circle segment, fifth-circle segment, sixth-circle segment or higher parts of a circle. In a sufficiently narrow segment, the semi-finished valve product 24 can only be produced by canting, since the share of the deformation in circumferential direction is negligible.

FIG. 2B presents a semi-finished valve product 4 in the form of a valve-half shell that is welded together out of two quarter-circle-segment semi-finished valve products 24 along the weld 18. This semi-finished valve product 4 can be used for production according to FIGS. 1A to 11E.

FIG. 3A shows a sheet that can be used as a semi-finished product for production of a semi-finished valve product 4. A semi-finished valve product 4 can be formed directly from a sheet by forging, drop-forging, pressing or deep-drawing.

FIG. 3B shows the sheet from FIG. 1, folded over on one end to produce a sheet with a higher material thickness. The folded part 8 of the sheet produces a larger material thickness of the sheet in the area of the later valve head 12.

FIG. 3C shows the sheet from FIG. 3B after drop forging, with the folded part 8 of the sheet connected to the remaining part of the sheet by welding or forge welding along the weld 18. Forming expands the part of the sheet that will later form the valve head in two directions, which would reduce the material thickness of the formed sheet. By using a semi-finished product with a higher material thickness in the area of the later valve head already, a valve can be produced easily with a wall thickness that is increased at the valve head or valve bottom as compared to the material thickness of the valve stem.

The semi-finished valve products produced according to FIGS. 3A to 3C can be used in the method presented in FIGS. 1A to 1E.

The invention claimed is:

1. A method for the production of a semi-finished valve product, comprising the steps of:
    folding a part of a sheet to form a folded part; and
    drop-welding, forging, deep-drawing, pressing or drop-forging the sheet with the folded part to form a segment of an internal combustion engine valve that corresponds to a circle segment of a valve cut open in the axial direction and wherein the folded part is formed into a segment of a valve head of the valve stem.

2. The method for the production of a semi-finished valve product according to claim 1, with the circle segment being semi-circular such that the segment of the valve stem has the shape of a half shell.

3. A semi-finished valve product, in the form of a circle segment of an internal combustion engine valve cut open in the axial direction, produced according to the method of claim 1.

4. The semi-finished valve product according to claim 3, with the circle segment corresponding to a semi-circle such that the semi-finished valve product has the shape of a half shell.

5. A method of making an internal combustion engine valve, comprising the steps of:
    forming of at least two semi-finished valve products, each of said semi-finished valve products being made according to a method, comprising the steps of;
    at least one of casting, forging, deep-drawing, pressing and drop-forging at least one metal material into a shape that corresponds to a circle segment of a valve cut open in the axial direction; and
    welding together the at least two semi-finished valve products with the at least two semi-finished valve products surrounding a cavity.

6. The method according to claim 5, further comprising the step of inserting sodium in the cavity before the step of welding together the semi-finished valve products.

7. The method according to claim 5, further comprising the step of machining the internal combustion engine valve.

8. The method according to claim 5, further including the step of coating an outer face of the internal combustion engine valve.

9. An internal combustion engine valve manufactured according to the method set forth in claim 5.

* * * * *